(12) United States Patent
Chen et al.

(10) Patent No.: US 9,315,592 B2
(45) Date of Patent: Apr. 19, 2016

(54) PROCESS FOR PRODUCING PROCATALYST COMPOSITION WITH ALKOXYALKYL ESTER INTERNAL ELECTRON DONOR AND PRODUCT

(71) Applicant: W.R. Grace & Co-Conn, Columbia, MD (US)

(72) Inventors: Linfeng Chen, Missouri City, TX (US); Tak W. Leung, Houston, TX (US); Kelly Gonzalez, Katy, TX (US); Tao Tao, Houston, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 255 days.

(21) Appl. No.: 13/854,453

(22) Filed: Apr. 1, 2013

(65) Prior Publication Data

US 2013/0225398 A1 Aug. 29, 2013

Related U.S. Application Data

(63) Continuation of application No. 12/974,548, filed on Dec. 21, 2010, now abandoned.

(51) Int. Cl.
 C08F 4/649 (2006.01)
 C08F 10/00 (2006.01)
 C08F 110/06 (2006.01)

(52) U.S. Cl.
 CPC .............. C08F 4/6498 (2013.01); C08F 10/00 (2013.01); C08F 110/06 (2013.01)

(58) Field of Classification Search
 None
 See application file for complete search history.

(56) References Cited

U.S. PATENT DOCUMENTS

| | | | |
|---|---|---|---|
| 4,563,436 | A | 1/1986 | Yokoyama et al. |
| 4,983,694 | A | 1/1991 | Furtek |
| 5,459,116 | A | 10/1995 | Ro et al. |
| 5,539,309 | A | 7/1996 | Van Wyk et al. |
| 6,384,160 | B1 | 5/2002 | Shamshoum et al. |
| 6,825,146 | B2 | 11/2004 | Kilty et al. |
| 2003/0027715 | A1 | 2/2003 | Fushimi et al. |
| 2004/0116278 | A1 | 6/2004 | Yang et al. |

(Continued)

FOREIGN PATENT DOCUMENTS

| | | |
|---|---|---|
| CN | 101914172 | 12/2010 |
| EP | 0849287 | 3/2005 |

(Continued)

OTHER PUBLICATIONS

International Search Report for PCT App. No. PCT/US2011/062779 mailed on Jun. 2, 2012.

(Continued)

Primary Examiner — Bijan Ahvazi
Assistant Examiner — Catherine S Branch
(74) Attorney, Agent, or Firm — Lerner, David, Littenberg, Krumholz & Mentlik, LLP

(57) ABSTRACT

Disclosed herein are processes for preparing procatalyst compositions with an internal electron donor containing greater than 4.5 wt % of a compounded alkoxyalkyl ester. Also disclosed are catalyst compositions containing the procatalyst composition and polymers, i.e., propylene-based polymers, produced therefrom. The present procatalyst compositions improve catalyst selectivity, catalyst activity, procatalyst morphology and polymer particle morphology, and improve hydrogen response during olefin polymerization.

25 Claims, 1 Drawing Sheet

(56) References Cited

U.S. PATENT DOCUMENTS

| | | |
|---|---|---|
| 2007/0066771 A1 | 3/2007 | Bradley et al. |
| 2010/0078479 A1 | 4/2010 | Epshteyn |
| 2012/0157295 A1 | 6/2012 | Chen et al. |

FOREIGN PATENT DOCUMENTS

| | | |
|---|---|---|
| JP | 60-130607 | 7/1985 |
| JP | 61-287907 | 12/1986 |
| JP | 61-287908 | 12/1986 |
| JP | 06104688 | 12/1986 |
| JP | 06104689 | 12/1986 |
| JP | 06104690 | 12/1986 |
| JP | 06104691 | 12/1986 |
| JP | 07017704 | 1/1987 |
| JP | 63291907 | 11/1988 |
| JP | 04173809 B2 | 6/1992 |
| JP | 2014-503652 A | 2/2014 |
| WO | 0238619 | 5/2002 |
| WO | 2009029487 | 6/2009 |
| WO | 2009085649 A1 | 7/2009 |
| WO | 2010078479 | 7/2010 |

OTHER PUBLICATIONS

International Preliminary Report on Patentability for PCT/US2011/062779, Dated May 17, 2013, 13 pages.
International Preliminary Report on Patentability for PCT/US2011/062763, Dated Aug. 13, 2013, 6 pages.
International Preliminary Report on Patentability for PCT/US2011/062989, Dated Jun. 58, 2013, 5 pages.
International Search Report and Written Opinion for PCT/US2011/062763, Dated Jul. 17, 2013, 8 pages.
International Search Report and Written Opinion for PCT/US2011/062779, Dated Jun. 2, 2012, 9 pages.
International Search Report and Written Opinion for PCT/US2011/062989, Dated Feb. 20, 2012, 7 pages.

PROCESS FOR PRODUCING PROCATALYST COMPOSITION WITH ALKOXYALKYL ESTER INTERNAL ELECTRON DONOR AND PRODUCT

CROSS REFERENCE TO RELATED APPLICATION

The present application is a continuation of U.S. patent application Ser. No. 12/974,548, filed on Dec. 21, 2010, the entire content of which is incorporated by reference herein.

BACKGROUND

The present disclosure provides a process for enhancing procatalyst and catalyst properties. The present disclosure provides formant polymers produced by these procatalysts/catalysts.

Worldwide demand for olefin-based polymers continues to grow as applications for these polymers become more diverse and more sophisticated. Known are Ziegler-Natta catalyst compositions for the production of olefin-based polymers and propylene-based polymers in particular. Ziegler-Natta catalyst compositions typically include a procatalyst containing a transition metal halide (i.e., titanium, chromium, vanadium), a cocatalyst such as an organoaluminum compound, and optionally an external electron donor. Many conventional Ziegler-Natta catalyst compositions include a magnesium chloride-supported titanium chloride procatalyst with a phthalate-based internal electron donor.

The health concerns from phthalate exposure are driving the art to find phthalate substitutes. Known are catalyst compositions containing an alkoxyalkyl ester (AE) as an internal electron donor for the production of propylene-based polymers. However, conventional AE-containing catalysts are currently not viable because their catalyst activity and/or selectivity are too low for commercial application. Desirable would be Ziegler-Natta procatalyst compositions containing an alkoxyalkyl ester internal electron donor with sufficient catalyst activity/selectivity for the commercial (i.e., large-scale) production of olefin-based polymers.

SUMMARY

The present disclosure provides a process for producing a Ziegler-Natta procatalyst composition containing an increased amount of alkoxyalkyl ester as an internal electron donor. The Applicant has discovered that multiple additions of alkoxyalkyl ester (including alkoxyalkyl ester containing small/no substituents) during procatalyst preparation surprisingly improve catalyst selectivity compared to conventional AE-containing catalysts which contain a lower amount of alkoxyalkyl ester. In addition to improved catalyst selectivity, the present procatalyst composition further exhibits desirable process characteristics (high hydrogen response, high catalyst activity) and produces olefin-based polymer, such as propylene-based polymers with low xylene solubles, high $T_{MF}$, good morphology and expanded in-reactor melt flow range.

The present disclosure provides a process. In an embodiment, a process is provided and includes first contacting a procatalyst precursor with an alkoxyalkyl ester and a halogenating agent to form a procatalyst intermediate. The process includes second contacting the procatalyst intermediate with an alkoxyalkyl ester that is the same or different than the alkoxyalkyl ester in the first contacting, and a halogenating agent. The process further includes forming a procatalyst composition comprising a combination of a magnesium moiety, a titanium moiety and the alkoxyalkyl ester.

The present disclosure provides another process. In an embodiment, a process is provided and includes first halogenating a procatalyst precursor to form a reaction mixture, and heating the reaction mixture to a temperature from 30° C. to 150° C. The process includes first adding an alkoxyalkyl ester to the reaction mixture from greater than 0 minutes to 30 minutes after the heating to form a procatalyst intermediate. The process includes second halogenating the procatalyst intermediate and second adding an alkoxyalkyl ester to the procatalyst intermediate. The process includes forming particles of a procatalyst composition, the particles having a particle size distribution (PSD) span of less than 2.0.

The present disclosure provides a composition. In an embodiment, a procatalyst composition is provided and includes a combination of a magnesium moiety, a titanium moiety, and greater than 4.5 wt % of a compounded alkoxyalkyl ester.

The present disclosure provides another composition. In an embodiment, a catalyst composition is provided and includes any procatalyst composition disclosed herein, a cocatalyst, and optionally an external electron donor.

An advantage of the present disclosure is the provision of an improved procatalyst/catalyst composition.

An advantage of the present disclosure is the provision of a procatalyst/catalyst composition with improved selectivity for the polymerization of olefin-based polymers.

An advantage of the present disclosure is a phthalate-free procatalyst/catalyst composition.

An advantage of the present disclosure is the provision of a phthalate-free catalyst composition and a phthalate-free olefin-based polymer produced therefrom.

DETAILED DESCRIPTION

Figure 1A:
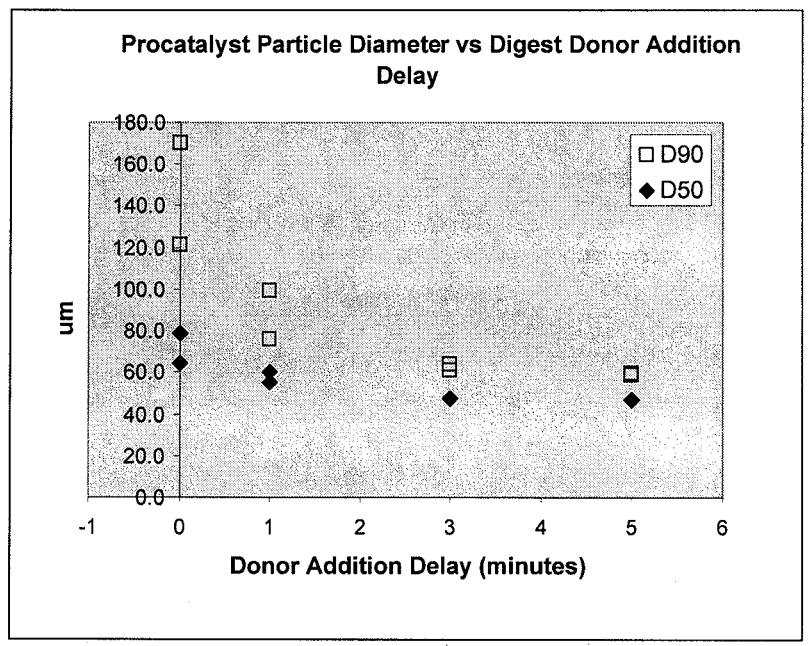
FIG. 1A is a graph showing catalyst particle size versus the delay in alkoxyalkyl ester addition in accordance with an embodiment of the present disclosure.

The present disclosure provides a process for producing a procatalyst composition having an alkoxyalkyl ester as an internal electron donor. The present process improves one or more of the following procatalyst properties: activity, selectivity, hydrogen response, and/or particle morphology.

In an embodiment, a process for producing a procatalyst composition is provided. The process includes first contacting a procatalyst precursor with an alkoxyalkyl ester and a halogenating agent to form a procatalyst intermediate. The process further includes second contacting the procatalyst intermediate with an alkoxyalkyl ester and a halogenating agent. The process includes forming a procatalyst composition comprising a combination of a magnesium moiety, a titanium moiety and a compounded alkoxyalkyl ester. The procatalyst composition contains greater than 4.5 wt % of the compounded alkoxyalkyl ester. Weight percent is based on total weight of the procatalyst composition.

Procatalyst Precursor

The procatalyst precursor contains magnesium and may be a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di ($C_{1-4}$) alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The MagTi precursor is prepared by controlled precipitation through removal of an alcohol from the precursor reaction medium used in their preparation. In an embodiment, a reaction medium comprises a mixture of an aromatic liquid, such as a chlorinated aromatic compound, or chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having desirable morphology and surface area. In a further embodiment, the resulting procatalyst precursor is a plurality of particles that are uniform in particle size.

In an embodiment, the procatalyst precursor is a benzoate-containing magnesium chloride material. As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include procatalysts of the trade names SHAC™ 103 and SHAC™ 310 available from The Dow Chemical Company, Midland, Mich. In an embodiment, the BenMag procatalyst precursor may be a product of halogenation of any procatalyst precursor (i.e., a MagMo precursor or a MagTi precursor) in the presence of a benzoate compound.

In an embodiment, the procatalyst precursor is synthesized so as to prepare procatalyst precursor particles having a D50 from about 5 µm, or about 10 µm to about 100 µm, or to about 50 µm, or to about 25 µm. The precursor preparation may also include a procedure whereby the particles are formed into rounded, smooth, spherical or substantially spherical (as opposed to jagged, rough or uneven) surface morphology. Subsequent halogenation and formation of the precursor into the procatalyst composition does not substantially change the D50 size range for the particles. Thus, the D50 for the procatalyst composition is also from about 5 µm, or about 10 µm to about 100 µm, or to about 50 µm, or to about 25 µm. The term "D50," as used herein, is the median particle diameter such that 50% of the sample weight is above the stated particle diameter.

First Contact

The present process includes first contacting the procatalyst precursor with an alkoxyalkyl ester and a halogenating agent to form a procatalyst intermediate. The term "contacting," or "contact," or "contact step" in the context of procatalyst synthesis, is the chemical reaction that occurs in a reaction mixture (optionally heated) containing a procatalyst precursor/intermediate, a halogenating agent (with optional titanating agent) an alkoxyalkyl ester, and a solvent. The reaction product of "contacting" is a procatalyst composition (or a procatalyst intermediate) that is a combination of a magnesium moiety, a titanium moiety, complexed with the alkoxyalkyl ester (internal electron donor).

Halogenation (or halogenating) occurs by way of a halogenating agent. A "halogenating agent," as used herein, is a compound that converts the procatalyst precursor (or procatalyst intermediate) into a halide form. A "titanating agent," as used herein, is a compound that provides the catalytically active titanium species. Halogenation and titanation convert the magnesium moiety present in the procatalyst precursor into a magnesium halide support upon which the titanium moiety (such as a titanium halide) is deposited.

In an embodiment, the halogenating agent is a titanium halide having the formula $Ti(OR^e)_f X_h$ wherein $R^e$ and X are defined as above, f is an integer from 0 to 3; h is an integer from 1 to 4; and f+h is 4. In this way, the titanium halide is simultaneously the halogenating agent and the titanating agent. In a further embodiment, the titanium halide is $TiCl_4$ and halogenation occurs by way of chlorination of the procatalyst precursor with the $TiCl_4$. The chlorination (and titanation) is conducted in the presence of a chlorinated or a non-chlorinated aromatic or aliphatic liquid, such as dichlorobenzene, o-chlorotoluene, chlorobenzene, benzene, toluene, xylene, octane, or 1,1,2-trichloroethane. In yet another embodiment, the halogenation and the titanation are conducted by use of a mixture of halogenating agent and chlorinated aromatic liquid comprising from 40 to 60 volume percent halogenating agent, such as $TiCl_4$.

The reaction mixture is heated to a temperature from about 30° C. to about 150° C. for a duration of about 2 minutes to about 100 minutes during halogenation (chlorination).

Alkoxyalkyl Ester Addition

The first contact step includes halogenating the procatalyst precursor in the presence of an alkoxyalkyl ester to form a procatalyst intermediate. The alkoxyalkyl ester may include the addition of one, two, or more different alkoxyalkyl esters. The alkoxyalkyl ester is added before, during, or after the heating of the reaction mixture. The alkoxyalkyl ester may be added before, during, or after addition of the halogenating agent to the procatalyst precursor. At least a portion of the halogenation of the procatalyst precursor proceeds in the presence of the alkoxyalkyl ester. The alkoxyalkyl ester is an internal electron donor. As used herein, an "internal electron donor" (or "IED") is a compound added or otherwise formed during formation of the procatalyst composition that donates at least one pair of electrons to one or more metals present in the resultant procatalyst composition. Not wishing to be bound by any particular theory, it is believed that during halogenation (and titanation) the internal electron donor (1) regulates the formation of active sites and thereby enhances catalyst stereoselectivity, (2) regulates the position of titanium on the magnesium-based support, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity.

In an embodiment, the alkoxyalkyl ester (or "AE") is an alkoxyethyl ester. The alkoxyethyl ester has the structure (I) set forth below.

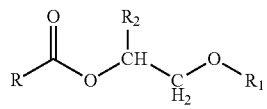

(I)

R, $R_1$ and $R_2$ are the same or different. Each of R, $R_1$ and $R_2$ is selected from hydrogen (except $R_1$ which is not hydrogen), a $C_1$-$C_{20}$ hydrocarbyl group, and a substituted $C_1$-$C_{20}$ hydrocarbyl group. In an embodiment, each of $R_1$ and $R_2$ is selected from a substituted/unsubstituted $C_1$-$C_{20}$ primary alkyl group or from a substituted/unsubstituted alkene group with the structure (II) below.

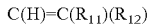

(II)

$R_{11}$ and $R_{12}$ are the same or different. Each of $R_{11}$ and $R_{12}$ is selected from hydrogen and a $C_1$-$C_{18}$ hydrocarbyl group.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and/or a silicon-containing hydrocarbyl group. As used herein, the term "halohydrocarbyl" group is a hydrocarbyl group that is substituted with one or more halogen atoms.

In an embodiment, the alkoxyalkyl ester is an aromatic alkoxyalkyl ester (or "AAE"). The aromatic alkoxyalkyl ester may be an aromatic alkoxyethyl ester with the structure (III) below.

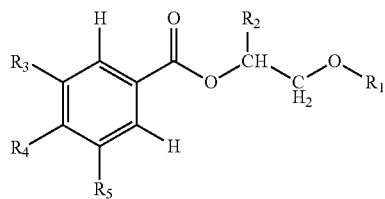

(III)

$R_1$ and $R_2$ are the same or different. $R_1$ is selected from a $C_1$-$C_{20}$ primary alkyl group and a substituted $C_1$-$C_{20}$ primary alkyl group. $R_2$ is selected from hydrogen, a $C_1$-$C_{20}$ primary alkyl group, and a substituted $C_1$-$C_{20}$ primary alkyl group. In an embodiment, each of $R_1$ and $R_2$ is selected from a $C_1$-$C_{20}$ primary alkyl group or from an alkene group with the structure (II) below.

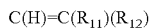

(II)

$R_{11}$ and $R_{12}$ are the same or different. Each of $R_{11}$ and $R_{12}$ is selected from hydrogen and a $C_1$-$C_{18}$ hydrocarbyl group.

$R_3$, $R_4$, $R_5$ of structure (III) are the same or different. Each of $R_3$, $R_4$, and $R_5$ is selected from hydrogen, a heteroatom, a $C_1$-$C_{20}$ hydrocarbyl group, a substituted $C_1$-$C_{20}$ hydrocarbyl group, and a $C_1$-$C_{20}$ hydrocarbyloxy group, and any combination thereof.

The alkoxyalkyl ester can be any alkoxyalkyl ester as set forth in Table 1. In an embodiment, the AAE is 2-methoxy-1-methyethyl benzoate.

In an embodiment, the AAE is 2-methoxyethyl benzoate. In an embodiment, the alkoxyalkyl ester includes an acrylate moiety and has the structure (IV) below.

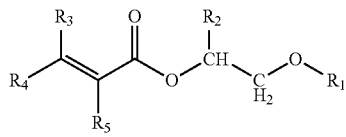

(IV)

$R_1$ and $R_2$ are the same or different. Each of $R_1$ and $R_2$ is selected from hydrogen (except $R_1$ which is not hydrogen), a $C_1$-$C_{20}$ hydrocarbyl group, and a substituted $C_1$-$C_{20}$ hydrocarbyl group and combinations thereof. In an embodiment, each of $R_1$ and $R_2$ is selected from a substituted/unsubstituted $C_1$-$C_{20}$ primary alkyl group or from an alkene group with the structure (II) below.

(II)

$R_{11}$ and $R_{12}$ are the same or different. Each of $R_{11}$ and $R_{12}$ is selected from hydrogen and a $C_1$-$C_{18}$ hydrocarbyl group.

$R_3$, $R_4$, $R_5$ of structure (IV) are the same or different. Each of $R_3$, $R_4$, and $R_5$ is selected from hydrogen, a heteroatom, a $C_1$-$C_{20}$ hydrocarbyl group, and a substituted $C_1$-$C_{20}$ hydrocarbyl group and any combination thereof. $R_3$, $R_4$, and/or $R_5$ may form one or more rings.

In an embodiment, the first contact step occurs in a reaction mixture. The process includes reacting the halogenating agent with the procatalyst precursor in the reaction mixture and adding the alkoxyalkyl ester to the reaction mixture from greater than 0 minutes to about 30 minutes after the reacting. The reaction mixture may be heated to a temperature from 30° C. to 150° C. before, during, or after the alkoxyalkyl ester addition to the reaction mixture.

Second Contact The first contact step forms a procatalyst intermediate. The process includes a second contacting the procatalyst intermediate with an alkoxyalkyl ester and a halogenating agent. In other words, a halogenating agent and additional alkoxyalkyl ester are added to the procatalyst intermediate to form the procatalyst composition. The procatalyst intermediate may be isolated from the initial reaction mixture prior to being subjected to the second contact step. The halogenating agent used in the second contact may be the same or different than the halogenating agent of the first contact. The alkoxyalkyl ester used in the second contact step may be one, two, or more different alkoxyalkyl esters.

During the second contact, the alkoxyalkyl ester may be added before, during, or after heating of the second reaction mixture. The alkoxyalkyl ester may be added before, during, or after addition of the halogenating agent to the procatalyst intermediate. The reaction mixture of the second contact is heated to a temperature of 30° C. to 150° C. for a duration of about 2 minutes to about 100 minutes.

The first contact step and the second contact step produce or otherwise form a procatalyst composition. The procatalyst composition includes a combination of a magnesium moiety, a titanium moiety, and a compounded alkoxyalkyl ester containing greater than 4.5 wt % of one or more alkoxyalkyl ester(s). In an embodiment, the process forms a procatalyst composition with a compounded alkoxyalkyl ester which contains greater than 5 wt %, or greater than 7 wt %, or greater than 10 wt % to 15 wt % alkoxyalkyl ester. Weight percent of the alkoxyalkyl ester is based on total weight of the procatalyst composition.

A "compounded alkoxyalkyl ester" as used herein, is an alkoxyalkyl ester compound complexed to a procatalyst component and formed by two or more of the foregoing contact steps (i.e., halogenation of procatalyst precursor/intermediate in the presence of one or more alkoxyalkyl esters) during procatalyst synthesis. The compounded alkoxyalkyl ester is present in the resultant procatalyst composition in an amount greater than 4.5 wt % (based on the total weight of the procatalyst composition).

Applicant has surprisingly discovered that the procatalyst composition with the compounded alkoxyalkyl ester unexpectedly produces a procatalyst composition with improved selectivity, improved catalyst activity, improved hydrogen response, and/or improved polymer melting point when compared to conventional alkoxyalkyl ester-containing procatalysts. Conventional alkoxyalkyl ester-containing procatalysts are single-addition alkoxyalkyl ester procatalysts and do not contain compounded alkoxyalkyl ester. The present procatalyst composition, with the compounded alkoxyalkyl ester (and greater than 4.5 wt % alkoxyalkyl ester), advantageously contains more alkoxyalkyl ester than conventional alkoxyalkyl ester-containing procatalysts. The present procatalyst composition is phthalate-free yet exhibits the same, or improved, selectivity and/or catalyst activity, hydrogen response, and/or polymer melting point when compared to phthalate-containing procatalyst compositions. These improvements make the present procatalyst composition suitable for commercial polymer production (i.e., greater than 10 ton/hr).

The advantages and improvements of the present procatalyst composition are unexpected. It is very difficult, if not impossible, to predict whether a compounded alkoxyalkyl ester will improve the overall performance of the resultant procatalyst composition. For example, Applicant observed that for some heavily substituted alkoxyalkyl ester compounds, such as 1-methoxypropan-1-phenylethyl benzoate and 1-methoxy-2-methylpropan 2-yl benzoate, multiple internal donor additions slightly increase internal electron donor content in the procatalyst, but do not improve catalyst selectivity. Bounded by no particular theory, this may be due to the insufficient binding strength between the internal electron donor and procatalyst. Other examples include 3-methoxypropyl pivalate, which exhibits higher internal electron donor content in the procatalyst upon multiple internal electron donor additions, but has lower selectivity.

In an embodiment, the present process includes third contacting the procatalyst intermediate with an alkoxyalkyl ester and a halogenating agent and subsequently forming a procatalyst composition containing a combination of a magnesium moiety, a titanium moiety and a compounded internal electron donor with greater than 5.0 wt % of the alkoxyalkyl ester. The alkoxyalkyl ester(s) of the third contact step may be the same or different than the first AE addition and/or the second AE addition. The reaction mixture may be the same or different than the reaction mixture of the first contact and/or the second contact. The reaction mixture during the third contact step may be heated to a temperature of 30° C. to 150° C. for a duration of about 2 minutes to about 100 minutes. In the third contact step, the alkoxyalkyl ester may be added before, during, or after heating. The process may include four, five, or more contact steps.

In an embodiment, the process includes one or more halogenation step(s) before or after one or more of the following: the first contact, the second contact, and the third contact.

The present disclosure provides another process. In an embodiment, a process is provided and includes first halogenating a procatalyst precursor to form a reaction mixture. The process includes heating the reaction mixture to a temperature from 30° C. to 150° C., and first adding an alkoxyalkyl ester to the reaction mixture. The first alkoxyalkyl ester addition occurs from greater than 0 minutes to 30 minutes after the heating. This forms a procatalyst intermediate. The process further includes second halogenating the procatalyst intermediate and second adding an alkoxyalkyl ester to the procatalyst intermediate. The process further includes forming particles of the procatalyst composition having a span of less 2.0.

In an embodiment, the particle span is from 0, or 0.1 to less than 2.0. In an embodiment, the particle span is from less than 1.5, or less than 1.0. The term "span," as used herein, is the width of the distribution of the procatalyst particles based on the 10%, 50% and 90% quantile. Span is calculated by way of the following equation.

$$\text{Span} = \frac{D[v, 0.9] - D[v, 0.1]}{D[v, 0.5]}$$

The volume median diameter D(v,0.5) is the diameter where 50% of the distribution is above and 50% is below a stated value. D(v,0.9), is the diameter where 90% of the volume distribution is below a stated value. D(v,0.1), is the diameter where 10% of the volume distribution is below a stated value.

In an embodiment, the process includes halogenating the procatalyst precursor for about one minute, or about two minutes, or about three minutes to 30 minutes and subsequently first adding the alkoxyalkyl ester to the reaction mixture to form the procatalyst intermediate.

In an embodiment, the process includes second heating the procatalyst intermediate to a temperature from 30° C. to 150° C. before the second alkoxyalkyl ester addition.

In another embodiment, the delayed addition of the alkoxyalkyl ester (after either the first halogenation and/or the second halogenation) takes place at a lower temperature, from about −60° C. to about 30° C.

Applicant unexpectedly discovered that delayed addition of the alkoxyalkyl ester improves the procatalyst composition particle morphology by reducing or eliminating particle agglomeration. In other words, the process includes initiating a heating profile for the reaction mixture and waiting a time period after the heat initiation to first add the alkoxyalkyl ester and form the procatalyst intermediate. The process includes heating the reaction mixture and delaying the alkoxyalkyl ester addition after heat initiation to improve particle size distribution. It is observed that use of alkoxyalkyl ester as internal electron donor, especially at high level, has a proclivity toward procatalyst particle agglomeration. The delayed AE addition after heating the reaction mixture disclosed herein advantageously eliminates (wholly or partially) procatalyst particle agglomeration.

In an embodiment, the process further includes forming particles of a procatalyst composition that is a combination of a magnesium moiety, a titanium moiety, and a compounded alkoxyalkyl ester, the procatalyst composition includes greater than 4.5 wt %, or greater than 5.0 wt % of the alkoxyalkyl ester.

Ethoxide content in the procatalyst composition indicates the completeness of conversion of precursor metal ethoxide into a metal halide. The multiple halogenation, the multiple contact steps, and/or delay of AE addition promote conversion of ethoxide into halide during halogenation. In an embodiment, the process includes forming a procatalyst composition having from about 0.01 wt %, or 0.05 wt % to about 1.0 wt %, or about 0.7 wt % ethoxide. Weight percent is based on the total weight of the procatalyst composition.

In any of the foregoing processes, the procatalyst composition may be rinsed or washed with a liquid diluent to remove unreacted $TiCl_4$ and may be dried to remove residual liquid, after or between halogenation steps. Typically the resultant solid procatalyst composition is washed one or more times with a "wash liquid," which is a liquid hydrocarbon such as an aliphatic hydrocarbon such as isopentane, isooctane, isohexane, hexane, pentane, or octane. Not wishing to be bound by any particular theory, it is believed that (1) further halogenation and/or (2) further washing results in desirable modification of the procatalyst composition, possibly by removal of certain undesired metal compounds that are soluble in the foregoing diluent.

The resulting procatalyst composition from any of the foregoing processes has a titanium content of from about 1.0 wt %, or about 1.5 wt %, or about 2.0 wt %, to about 6.0 wt %, or about 5.5 wt %, or about 5.0 wt %. The weight ratio of titanium to magnesium in the solid procatalyst composition is suitably between about 1:3 and about 1:160, or between about 1:4 and about 1:50, or between about 1:6 and 1:30. The compounded alkoxyalkyl ester may be present in the procatalyst composition in a molar ratio of compounded alkoxyalkyl ester to magnesium of from about 0.005:1 to about 1:1, or from about 0.01:1 to about 0.4:1. Weight percent is based on the total weight of the procatalyst composition.

Any of the foregoing processes may comprise two or more embodiments disclosed herein.

Procatalyst Composition

The present disclosure provides a procatalyst composition produced by any of the foregoing processes. In an embodiment, a procatalyst composition is provided and includes a combination of a magnesium moiety, a titanium moiety, and a compounded alkoxyalkyl ester.

The compounded alkoxyalkyl ester may contain one, two or more alkoxyalkyl esters. The procatalyst composition contains greater than 4.5 wt % compounded alkoxyalkyl ester. Weight percent is based on total weight of the procatalyst composition. In a further embodiment, the procatalyst composition includes greater than 5 wt %, or greater than 7 wt %, or greater than 10 wt % to about 15 wt % of the compounded alkoxyalkyl ester.

In an embodiment, the magnesium moiety is a magnesium chloride. The titanium moiety is a titanium chloride.

In an embodiment, the alkoxyalkyl ester is an alkoxyethyl ester with the structure (I).

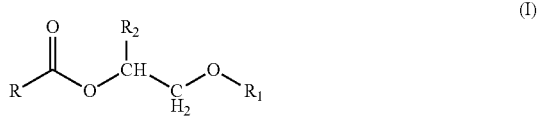

(I)

R, $R_1$, and $R_2$ are the same or different. Each of R, $R_1$, and $R_2$ is selected from hydrogen (except $R_1$ which is not hydrogen), a $C_1$-$C_{20}$ hydrocarbyl group, a substituted $C_1$-$C_{20}$ hydrocarbyl group, a substituted/unsubstituted $C_2$-$C_{20}$ alkene group, and combinations thereof. In an embodiment, R is an aliphatic $C_1$-$C_{20}$ hydrocarbyl group, optionally containing one or more halogen atoms and/or one or more silicon atoms.

In an embodiment, $R_1$ and $R_2$ are the same or different. Each of $R_1$ and $R_2$ is selected from a $C_1$-$C_{20}$ hydrocarbyl group, a substituted $C_1$-$C_{20}$ hydrocarbyl group. In an embodiment, each of $R_1$ and $R_2$ is selected from a substituted/unsubstituted $C_1$-$C_{20}$ primary alkyl group or from a substituted/unsubstituted $C_2$-$C_{20}$ alkene group with the structure (II) below.

(II)

$R_{11}$ and $R_{12}$ are the same or different. Each of $R_{11}$ and $R_{12}$ is selected from hydrogen and a $C_1$-$C_{18}$ hydrocarbyl group.

In an embodiment, the alkoxyalkyl ester is an aromatic alkoxyalkyl ester (AAE). The aromatic alkoxy ester may be an aromatic alkoxyethyl ester with the structure (III) below.

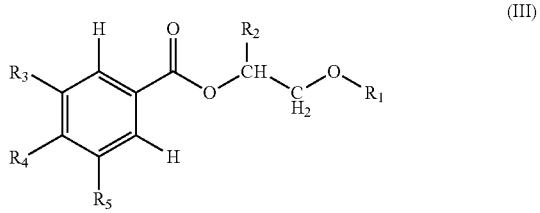

(III)

$R_1$ and $R_2$ are the same or different. $R_1$ is selected from a $C_1$-$C_{20}$ primary alkyl group and a substituted $C_1$-$C_{20}$ primary alkyl group. $R_2$ is selected from hydrogen, a $C_1$-$C_{20}$ primary alkyl group, and a substituted $C_1$-$C_{20}$ primary alkyl group. In an embodiment, each of $R_1$ and $R_2$ is selected from a substituted/unsubstituted $C_1$-$C_{20}$ primary alkyl group or from a substituted/unsubstituted alkene group with the structure (II) below.

(II)

$R_{11}$ and $R_{12}$ are the same or different. Each of $R_{11}$ and $R_{12}$ is selected from hydrogen and a $C_1$-$C_{18}$ hydrocarbyl group.

$R_3$, $R_4$, $R_5$ of structure (III) are the same or different. Each of $R_3$, $R_4$, and $R_5$ is selected from hydrogen, a heteroatom, a $C_1$-$C_{20}$ hydrocarbyl group, a substituted $C_1$-$C_{20}$ hydrocarbyl group, and a $C_1$-$C_{20}$ hydrocarbyloxy group, and any combination thereof.

Nonlimiting examples of suitable alkoxyalkyl esters are provided in Table 1 below. In an embodiment, the AAE is 2-methoxy-1-methyethyl benzoate.

In an embodiment, the AAE is 2-ethoxy-1-methyethyl benzoate.

In an embodiment, the AAE is 2-methoxyethyl benzoate.

In an embodiment, the AAE is 2-ethoxyethyl benzoate.

In an embodiment, the procatalyst composition contains greater than 5 wt %, or greater than 5 wt % to 15 wt % of a halo-substituted alkoxyethyl benzoate.

In an embodiment, the procatalyst composition contains greater than 10 wt %, or greater than 10 wt % to 15 wt % of an unsubstituted alkoxyethyl benzoate.

In an embodiment, the alkoxyalkyl ester includes an acrylate moiety and has the structure (IV) below.

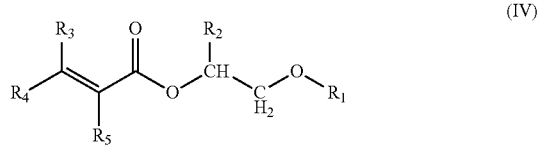

$R_1$ and $R_2$ are the same or different. Each of $R_1$ and $R_2$ is selected from hydrogen (except $R_1$ which is not hydrogen), a $C_1$-$C_{20}$ hydrocarbyl group, and a substituted $C_1$-$C_{20}$ hydrocarbyl group. In an embodiment, each of $R_1$ and $R_2$ is selected from a substituted/unsubstituted $C_1$-$C_{20}$ primary alkyl group or from substituted/unsubstituted alkene group with the structure (II) below.

$R_{11}$ and $R_{12}$ are the same or different. Each of $R_{11}$ and $R_{12}$ is selected from hydrogen and a $C_1$-$C_{18}$ hydrocarbyl group.

$R_3$, $R_4$, $R_5$ of structure (IV) are the same or different. Each of $R_3$, $R_4$, and $R_5$ is selected from hydrogen, a heteroatom, a $C_1$-$C_{20}$ hydrocarbyl group, and a substituted $C_1$-$C_{20}$ hydrocarbyl group and any combination thereof. $R_3$, $R_4$, and/or $R_5$ may form one or more rings.

The procatalyst composition may comprise two or more embodiments disclosed herein.

Catalyst Composition

The present disclosure provides a catalyst composition. In an embodiment, the catalyst composition includes a procatalyst composition with a compounded alkoxyalkyl ester containing greater than 4.5 wt % of an alkoxyalkyl ester (internal electron donor). The catalyst composition also includes a cocatalyst, and optionally an external electron donor. The procatalyst composition may be any of the foregoing procatalyst compositions.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $R_nAlX_{3-n}$ wherein n=1 2, or 3, R is an alkyl, and X is a halide or alkoxide. In an embodiment, the cocatalyst is selected from trimethylaluminum, triethylaluminum, triisobutylaluminum, and tri-n-hexylaluminum.

Nonlimiting examples of suitable hydrocarbyl aluminum compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, dimethylaluminum chloride, triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum, diisobutylaluminum hydride, and di-n-hexylaluminum hydride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

As used herein, an "external electron donor" (or "EED") is a compound added independent of procatalyst formation and includes at least one functional group that is capable of donating a pair of electrons to a metal atom. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distribution (MWD), and melting point.

In an embodiment, the EED is a silicon compound having the general formula (V):

$$SiR_m(OR')_{4-m} \qquad (V)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, 2, or 3. In an embodiment, R is $C_{6-12}$ aryl, alkyl or alkylaryl, $C_{3-12}$ cycloalkyl, $C_{3-12}$ branched alkyl, or $C_{2-12}$ cyclic amino group, R' is $C_{1-4}$ alkyl, and m is 1 or 2.

In an embodiment, the silicon compound is dicyclopentyldimethoxysilane (DCPDMS), methylcyclohexyldimethoxysilane (MChDMS), or n-propyltrimethoxysilane (NPTMS), and any combination thereof.

Polymerization

Any of the foregoing catalyst compositions may be used in a polymerization process. In an embodiment, a polymerization process is provided and includes contacting, under polymerization conditions, the catalyst composition composed of the procatalyst composition containing greater than 4.5 wt % of the compounded alkoxyalkyl ester, a cocatalyst, optionally an external electron donor with propylene and optionally one or more olefins. The polymerization forms a propylene-based polymer having less than 6 wt %, or less than 4 wt %, or less than 2.5 wt %, or less than 2 wt %, or from 0.1 wt % to less than 6 wt % xylene solubles (XS). Weight percent XS is based on the total weight of the polymer.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

The polymerization reaction forms a propylene homopolymer or a propylene copolymer. Optionally, one or more olefin monomers can be introduced into a polymerization reactor along with the propylene to react with the procatalyst, cocatalyst, and EED and to form a polymer, or a fluidized bed of polymer particles. Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like.

In an embodiment, the polymerization process may include a pre-polymerization step and/or a pre-activation step.

In an embodiment, the process includes mixing the external electron donor with the procatalyst composition. The external electron donor can be complexed with the cocatalyst and mixed with the procatalyst composition (pre-mixed) prior to contact between the catalyst composition and the olefin. In another embodiment, the external electron donor can be added independently to the polymerization reactor.

In an embodiment, the process includes forming a propylene-based polymer (propylene homopolymer or propylene copolymer) containing an alkoxyalkyl ester. The alkoxyalkyl ester may be one or more alkoxyalkyl esters in Table 1. The propylene-based polymer has one or more of the following properties:
- a melt flow rate (MFR) from about 0.01 g/10 min to about 800 g/10 min, or from about 0.1 g/10 min to about 200 g/10 min, or from about 0.5 g/10 min to about 150 g/10 min; and/or
- a xylene solubles content from about 0.5% to about 10%, or from about 1.0% to about 8%, or from about 1.0% to about 6%, or from 0.1% to less than 5%; and/or
- a polydispersity index (PDI) from about 3.0 to about 8.0, and/or
- particles thereof with a bulk density greater than 0.28 g/cc to about 0.50 g/cc.

The propylene-based polymer may comprise two or more embodiments disclosed herein.

In an embodiment, the procatalyst composition the catalyst composition, and/or the polymer produced therefrom are/is phthalate-free or are/is otherwise void or devoid of phthalate and derivatives thereof.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term, "bulk density," (or "BD") as used herein, is the density of the polymer produced. Bulk density is determined by pouring the polymer resin through a standard powder funnel into a stainless standard cylinder and determining the weight of the resin for the given volume of the filled cylinder in accordance with ASTM D 1895B or equivalent.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "primary alkyl group" has the structure —$CH_2R_1$ wherein $R_1$ is hydrogen or a substituted/unsubstituted hydrocarbyl group.

The term, "propylene-based polymer," as used herein, refers to a polymer that comprises a majority weight percent polymerized propylene monomer (based on the total amount of polymerizable monomers), and optionally may comprise at least one polymerized comonomer.

A "secondary alkyl group" has the structure —$CHR_1R_2$ wherein each of $R_1$ and $R_2$ is a substituted/unsubstituted hydrocarbyl group.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

A "tertiary alkyl group" has the structure —$CR_1R_2R_3$ wherein each of $R_1$, $R_2$, and $R_3$ is a substituted/unsubstituted hydrocarbyl group.

Test Methods

Final melting point $T_{MF}$ is the temperature to melt the most perfect crystal in the sample and is regarded as a measure for isotacticity and inherent polymer crystallizability. The test was conducted using a TA Q100 Differential Scanning Calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing procedure:
(1) Calibrate instrument with high purity indium as standard.
(2) Purge the instrument head/cell with a constant 50 ml/min flow rate of nitrogen constantly.
(3) Sample preparation:
   Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
   (i) Data storage: off
   (ii) Ramp 80.00° C./min to 240.00° C.
   (iii) Isothermal for 1.00 min
   (iv) Ramp 80.00° C./min to 0.00° C.
   (v) Isothermal for 1.00 min
   (vi) Ramp 80.00° C./min to 150.00° C.
   (vii) Isothermal for 5.00 min
   (viii) Data storage: on
   (ix) Ramp 1.25° C./min to 180.00° C.
   (x) End of method
(6) Calculation: $T_{MF}$ is determined by the interception of two lines. Draw one line from the baseline of high temperature. Draw another line from through the deflection of the curve close to the end of the curve at high temperature side.

Melt flow rate (MFR) is measured in accordance with ASTM D 1238-01 test method at 230° C. with a 2.16 kg weight for propylene-based polymers.

Polydispersity Index (PDI) is measured by an AR-G2 rheometer which is a stress control dynamic spectrometer manufactured by TA Instruments using a method according to Zeichner GR, Patel PD (1981) "A comprehensive Study of Polypropylene Melt Rheology" Proc. Of the $2^{nd}$ World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:I); (2) Diameter: 25 mm; (3) Truncation gap: 149 micron. The geometry of the bottom plate is 25 mm cylinder.

Testing procedure:
(1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate.
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.
(7) The upper cone is lowered again to the truncation gap which is 149 micron.
(8) An Oscillatory Frequency Sweep test is performed under these conditions:
   Test delayed at 180° C. for 5 minutes.
   Frequencies: 628.3 r/s to 0.1 r/s.
   Data acquisition rate: 5 point/decade.
   Strain: 10%
(9) When the test is completed the crossover modulus (Gc) is detected by the Rheology Advantage Data Analysis program furnished by TA Instruments.
(10) PDI=100,000÷Gc (in Pa units).

PSD (Particle Size Distribution) span is measured according to Method No. A 8 d (Particle Size Distribution by Laser (Malvern)) provided by GEA Niro (www.niro.dk/niro/cms-doc.nsf/WebDoc/ndkw6u9by4). The span is the width of the distribution based on the 10%, 50% and 90% quantile and is determined by way of the equation below.

$$\text{Span} = \frac{D[v, 0.9] - D[v, 0.1]}{D[v, 0.5]}$$

The volume median diameter D(v,0.5) is the diameter where 50% of the distribution is above and 50% a stated value. D(v,0.9), is the diameter where 90% of the volume distribution is below a stated value. D(v,0.1), is the diameter where 10% of the volume distribution is below a stated value.

Xylene Solubles (XS) is measured using a $^1$H NMR method as described in U.S. Pat. No. 5,539,309, the entire content of which is incorporated herein by reference.

By way of example and not by limitation, examples of the present disclosure will now be provided.

Examples

1. Procatalyst Precursor

MagTi-1 is used as a procatalyst precursor. MagTi-1 is a mixed Mg/Ti precursor with composition of $Mg_3Ti(OEt)_8Cl_2$ (prepared according to example 1 in U.S. Pat. No. 6,825,146). Titanium content for each of the resultant procatalyst compositions is listed in Table 1. The peaks for internal donors are assigned according to retention time from GC analysis.

A. First Contact 3.00 g of MagTi-1 is charged into a flask equipped with mechanical stirring and with bottom filtration. 60 ml of a mixed solvent of $TiCl_4$ and chlorobenzene (1/1 by volume) is introduced into the flask followed immediately by addition of 2.52 mmol of alkoxyalkyl ester or DiBP. The mixture is heated to 115° C. in 15 minutes and remains at 115° C. for 60 minutes with stirring at 250 rpm before filtering off the liquid.

B. Second Contact/Halogenation 60 ml of mixed solvent and optionally 2.52 mmol of alkoxyalkyl ester are added again and the reaction is allowed to continue at the same desired temperature for 30 minutes with stirring followed by filtration.

C. Third Contact/Halogenation

Same as second halogenation.

The final procatalyst composition is rinsed three times at room temperature with 70 ml of isooctane and dried under nitrogen flow for 2 hours.

Procatalyst properties are set forth in Table 1 below. Weight percent is based on total weight of the procatalyst composition. The data in Table 1 are based on MagTi-1 as the procatalyst precursor. Abbreviations in Table 1 indicate the following: EtO—Ethoxide, IED—Internal Electron Donor (complexed form of AE or DiBP in procatalyst), EB—Ethyl Benzoate, DiBP—Diisobutyl Phthalate, NM=not measured.

TABLE 1

| Ref # | AE | Name | $1^{st}$ AE Addition (mmol) | $2^{nd}$ AE Addition (mmol) | $3^{rd}$ AE Addition (mmol) | Ti (%) | EtO (%) | AE (%) | EB (%) |
|---|---|---|---|---|---|---|---|---|---|
| DiBP (comparative) | | Diisobutyl phthalate | 2.52 | | | 2.92 | 0.53 | 11.91 | |
| 1 | | 2-methoxyethyl benzoate | 2.52 2.52 | 2.52 | | 4.87 3.39 | 0.43 0.40 | 8.57 11.74 | 2.04 0.17 |
| 2 | | 2-isopropoxyethyl benzoate | 2.52 2.52 2.52 | 2.52 2.52 | 2.52 | 3.63 3.22 2.85 | 0.42 0.36 0.27 | 5.69 7.79 12.92 | 1.12 0.49 0.19 |
| 3 | | 1-methoxypropan-2-yl benzoate | 2.52 2.52 | 2.52 | | 3.48 2.46 | 0.56 0.49 | 7.58 12.70 | 5.55 1.17 |

TABLE 1-continued

| Ref # | AE | Name | 1st AE Addition (mmol) | 2nd AE Addition (mmol) | 3rd AE Addition (mmol) | Ti (%) | EtO (%) | AE (%) | EB (%) |
|---|---|---|---|---|---|---|---|---|---|
| 4 | 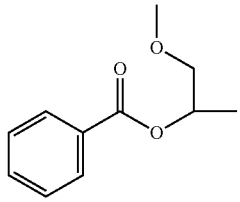 | 1-methoxypropan-2-yl benzoate | 2.52<br>2.52 | 2.52 | | 4.54<br>2.47 | 0.85<br>0.40 | 7.51<br>12.96 | 5.41<br>1.52 |
| 5 | 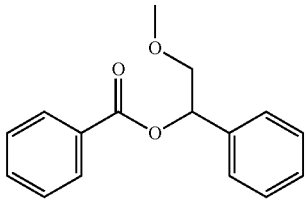 | 1-methoxypropan-1-phenylethyl benzoate | 2.52<br>2.52 | 2.52 | | 4.12<br>3.65 | 0.90<br>0.65 | 2.46<br>4.89 | 5.84<br>3.44 |
| 6 | 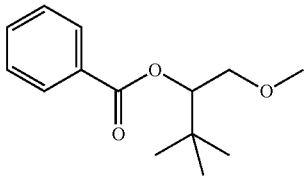 | 1-methoxy-3,3-dimethlbutan-2-yl benzoate | 2.52<br>2.52 | 2.52 | | 2.99<br>1.98 | 0.25<br>0.18 | 11.64<br>15.58 | 0.99<br>0.65 |
| 7 | 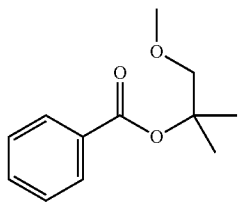 | 1-methoxy-2-methylpropan-2-benzoate | 2.52<br>2.52 | 2.52 | | 4.11<br>3.33 | NM<br>0.53 | 2.17<br>4.59 | 4.29<br>1.98 |
| 8 | 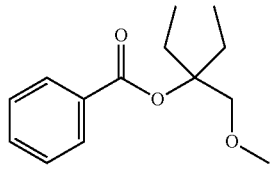 | 3-(methoxymethyl) pentan-3-yl benzoate | 2.52<br>2.52 | 2.52 | | 3.75<br>3.51 | 0.55<br>0.62 | 2.76<br>4.61 | 2.41<br>2.26 |
| 9 | 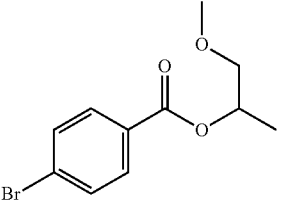 | 1-methoxypropan-2-yl 4-ethylbenzoate | 2.52<br>2.52 | 2.52 | | 3.20<br>2.32 | 0.52<br>0.39 | 4.58<br>10.85 | 0.06<br>4.48 |
| 11 | 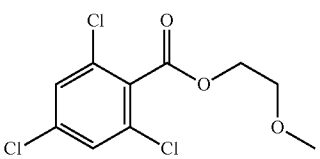 | 2-methoxyethyl 2,4,6-trichlorobenzoate | 2.52 | | | 3.19 | 0.69 | 5.34 | |

TABLE 1-continued

| Ref # | AE | Name | 1st AE Addition (mmol) | 2nd AE Addition (mmol) | 3rd AE Addition (mmol) | Ti (%) | EtO (%) | AE (%) | EB (%) |
|---|---|---|---|---|---|---|---|---|---|
| 12 | | 2-methoxyethyl 4-ethoxybenzoate | 2.52 2.52 | 2.52 | | 2.88 2.57 | 0.28 0.43 | 2.57 5.97 | |
| 13 | | 1-methoxypropan-2-yl 4-ethoxybenzoate | 2.52 2.52 | 2.52 | | 3.41 1.96 | 0.65 0.49 | 5.92 4.20 | |
| 14 | | 1-methoxy-3,3-dimethylbutan-2-yl 1-naphthoate | 2.52 2.52 | 2.52 | | 3.00 2.78 | 0.30 0.33 | 0.15 1.36 | |
| 15 | | 2-methoxyethyl 3-methylbutanoate | 2.52 2.52 | 2.52 | | 3.87 2.46 | 0.98 0.40 | 1.45 20.50 | |
| 16 | | 2-methoxyethyl isobutyrate | 2.52 2.52 | 2.52 | | 3.72 2.11 | 0.71 0.33 | Trace 5.25 | |
| 17 | | 2-methoxyethyl cyclohexanecarboxylate | 2.52 2.52 | 2.52 | | 3.58 2.42 | 0.86 0.45 | 4.50 8.43 | |
| 18 | | 2-methoxyethyl pivalate | 2.52 2.52 | 2.52 | | 3.82 2.53 | 1.02 0.49 | 0.92 3.70 | |

TABLE 1-continued

| Ref # | AE | Name | 1st AE Addition (mmol) | 2nd AE Addition (mmol) | 3rd AE Addition (mmol) | Ti (%) | EtO (%) | AE (%) | EB (%) |
|---|---|---|---|---|---|---|---|---|---|
| 19 | | 2-ethoxyethyl 2,2,2-trichloroacetate | 2.52 2.52 | 2.52 | | NM NM | 0.98 0.45 | trace 1.33 | |
| 20 | | 2-methoxyethyl methacrylate | 2.52 2.52 | 2.52 | | NM NM | 0.39 0.35 | 0.72 5.91 | |
| 21 | | 2-ethoxyethyl methacrylate | 2.52 2.52 | 2.52 | | 3.97 2.39 | 0.50 0.21 | 1.72 4.68 | |
| 22 | | 1-methoxypropan-2-yl acetate | 2.52 2.52 | 2.52 | | NM NM | 1.05 0.47 | 2.69 4.57 | |
| 23 | | 1-methoxypropan-2-yl 3-methylbutanoate | 2.52 2.52 | 2.52 | | 3.91 3.04 | 0.70 0.37 | 1.97 8.26 | |
| 24 | | 1-methoxypropan-2-yl isobutyrate | 2.52 2.52 | 2.52 | | 3.84 2.84 | 1.31 0.55 | 1.57 6.02 | |
| 25 | | 1-methoxypropan-2-yl pivalate | 2.52 2.52 | 2.52 | | 4.67 3.32 | 0.21 0.41 | NM NM | |
| 26 | | 1-methoxy-3,3-dimethylbutan-2-yl acetate | 2.52 2.52 | 2.52 | | 4.18 2.97 | 0.84 0.57 | trace 0.11 | |

TABLE 1-continued

| Ref # | AE | Name | 1st AE Addition (mmol) | 2nd AE Addition (mmol) | 3rd AE Addition (mmol) | Ti (%) | EtO (%) | AE (%) | EB (%) |
|---|---|---|---|---|---|---|---|---|---|
| 27 | | 1-methoxy-3,3-dimethylbutan-2-yl isobutyrate | 2.52 2.52 | 2.52 | | 3.85 2.71 | 0.80 0.25 | 4.69 6.18 | |
| 28 | | 1-methoxy-3,3-dimethylbutan-2-yl cyclohexanecarboxylate | 2.52 2.52 | 2.52 | | 5.24 4.04 | 0.48 0.38 | 3.56 5.53 | |
| 29 | | 1-methoxy-2,3-dihydro-1H-inden-2-yl acetate | 2.52 | 2.52 | | 2.97 | 0.59 | trace | |

2. Polymerization

Polymerization is performed in liquid propylene in a 1-gallon autoclave. After conditioning, the reactor is charged with 1375 g of propylene and a targeted amount of hydrogen and brought to 62° C. 0.25 mmol of dicyclopentyldimethoxysilane is added to a 0.27 M triethylaluminum solution in isooctane, followed by addition of a 5.0 wt % procatalyst slurry in mineral oil (actual solid weight is indicated in Table 2 below). The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is maintained at 67° C. Total polymerization time was 1 hour.

Polymer samples are tested for melt flow rate (MFR), xylene solubles (XS), polydispersity index (PDI), and final melting point ($T_{MF}$). XS is measured using $^1$H NMR method.

Catalyst performance and polymer properties are provided in Table 2 below.

NM=Not measured

N/A=Not available

TABLE 2

| Ref # | AE | Number Of AE Additions | Procatalyst (mg) | Al/EED | H$_2$ (mmol) | MFR (g/10 min) | XS (%) | Activity (kg/g-hr) | PDI | $T_{MF}$ (° C.) |
|---|---|---|---|---|---|---|---|---|---|---|
| DiBP | | 1 | 11.0 | 6.8 | 55.8 | 1.6 | 2.9 | 30.5 | 4.50 | 172.00 |
| 1 | | 1 | 17.4 | 8.0 | 83.5 | 5.4 | 4.3 | 24.4 | | |
| | | 2 | 17.4 | 8.0 | 83.5 | 1.7 | 3.1 | 27.4 | | |
| 2 | | 1 | 16.7 | 6.8 | 67.0 | 5.5 | 8.1 | 16.5 | | |
| | | 2 | 16.7 | 6.8 | 67.0 | 4.3 | 9.1 | 14.4 | | |
| | | 3 | 16.7 | 6.8 | 67.0 | 5.7 | 8.1 | 10.3 | | |

TABLE 2-continued
| Ref # | AE | Number Of AE Additions | Pro-catalyst (mg) | Al/ EED | H$_2$ (mmol) | MFR (g/10 min) | XS (%) | Activity (kg/g-hr) | PDI | T$_{MF}$ (° C.) |
|---|---|---|---|---|---|---|---|---|---|---|
| 3 | 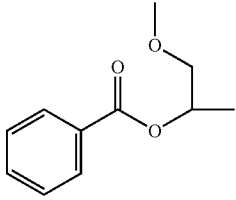 | 1<br>2 | 16.7<br>16.7 | 6.8<br>6.8 | 83.5<br>83.5 | 5.8<br>3.4 | 6.7<br>3.1 | 29.6<br>18.0 | 4.92<br>4.48 | 171.70 |
| 4 | 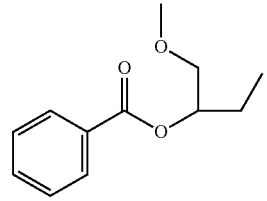 | 1<br>2 | 16.7<br>16.7 | 6.8<br>6.8 | 83.5<br>83.5 | 5.6<br>3.3 | 7.1<br>4.0 | 31.9<br>17.8 | 4.57<br>4.61 | 171.63 |
| 5 | 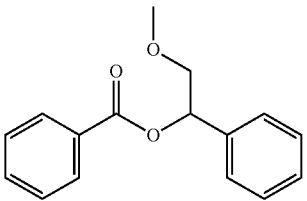 | 1<br>2 | 16.7<br>16.7 | 6.8<br>6.8 | 83.5<br>83.5 | 5.9<br>6.7 | 7.8<br>7.9 | 16.2<br>12.8 | 4.79<br>3.95 |  |
| 6 | 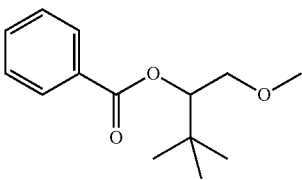 | 1<br>2 | 16.7<br>16.7 | 8.0<br>8.0 | 67.0<br>67.0 | 5.4<br>4.1 | 8.8<br>8.1 | 28.9<br>26.6 |  |  |
| 7 | 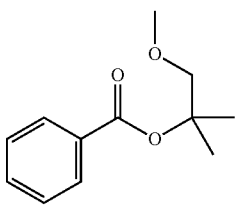 | 1<br>2 | 16.7<br>16.7 | 6.8<br>6.8 | 83.5<br>83.5 | 7.1<br>8.3 | 7.9<br>8.6 | 13.9<br>11.7 | 4.90<br>5.08 |  |
| 8 | 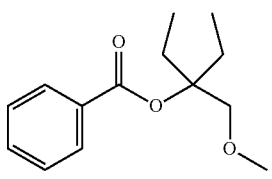 | 1<br>2 | 16.7<br>16.7 | 6.8<br>6.8 | 67.0<br>44.6 | 5.9<br>6.4 | 9.1<br>8.7 | 15.7<br>14.1 |  |  |
| 9 | 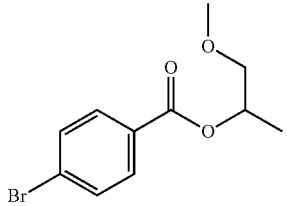 | 1<br>2 | 16.7<br>16.7 | 8.0<br>8.0 | 67.0<br>67.0 | 9.7<br>1.5 | 7.1<br>4.1 | 29.1<br>35.1 | 4.45 | 171.26 |

TABLE 2-continued

| Ref # | AE | Number Of AE Additions | Pro-catalyst (mg) | Al/EED | H$_2$ (mmol) | MFR (g/10 min) | XS (%) | Activity (kg/g-hr) | PDI | T$_{MF}$ (° C.) |
|---|---|---|---|---|---|---|---|---|---|---|
| 11 | 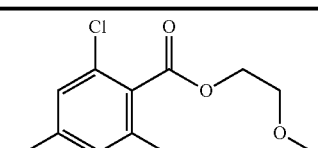 | 1 | 16.7 | 6.8 | 67.0 | 5.2 | 8.7 | 18.8 | | |
| 12 | 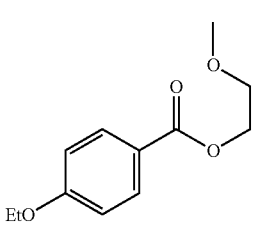 | 1<br>2 | 16.7<br>16.7 | 8.0<br>8.0 | 67.0<br>67.0 | 10.2<br>4.6 | 10.1<br>5.8 | 19.5<br>16.7 | <br>4.83 | <br>170.75 |
| 13 | 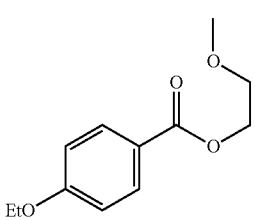 | 1<br>2 | 16.7<br>16.7 | 8.0<br>8.0 | 67.0<br>67.0 | 7.5<br>4.2 | 8.7<br>5.1 | 26.5<br>30.4 | <br>4.39 | <br>171.09 |
| 14 | 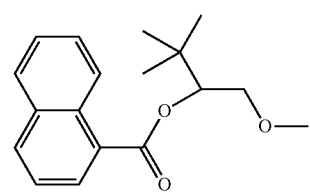 | 1<br>2 | 17.4<br>17.4 | 4.0<br>4.0 | 67.0<br>67.0 | 12.8<br>8.6 | 12.6<br>11.1 | 8.5<br>9.1 | | |
| 16 | 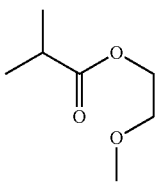 | 1<br>2 | 16.7<br>16.7 | 6.8<br>6.8 | 67.0<br>67.0 | 7.2<br>6.0 | 8.6<br>6.9 | 16.6<br>11.0 | <br>5.12 | |
| 20 | 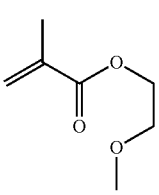 | 1<br>2<br>3 | 16.7<br>16.7<br>16.7 | 6.8<br>6.8<br>6.8 | 67.0<br>67.0<br>67.0 | 4.0<br>1.5<br>1.5 | 7.0<br>2.6<br>2.1 | 13.5<br>8.0<br>3.7 | 5.03<br>4.56<br>4.42 | <br>172.32<br> |
| 21 | 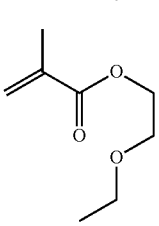 | 1<br>2<br>3 | 16.7<br>16.7<br>16.7 | 6.8<br>6.8<br>6.8 | 67.0<br>67.0<br>67.0 | 5.6<br>1.7<br>2.5 | 6.3<br>2.3<br>3.5 | 12.6<br>12.9<br>3.6 | 4.96<br>4.53<br>4.71 | <br>172.10<br> |
| 22 | 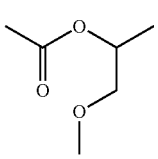 | 1<br>2<br>3 | 16.7<br>16.7<br>16.7 | 6.8<br>6.8<br>6.8 | 67.0<br>67.0<br>67.0 | 4.9<br>3.1<br>2.7 | 7.3<br>4.4<br>2.5 | 19.0<br>15.0<br>8.8 | 4.71<br>4.58<br>4.48 | <br><br>171.81 |

TABLE 2-continued

| Ref # | AE | Number Of AE Additions | Pro-catalyst (mg) | Al/EED | H$_2$ (mmol) | MFR (g/10 min) | XS (%) | Activity (kg/g-hr) | PDI | T$_{MF}$ (°C.) |
|---|---|---|---|---|---|---|---|---|---|---|
| 23 | | 1 | 16.7 | 6.8 | 67.0 | 6.7 | 7.4 | 20.3 | 4.82 | |
| | | 2 | 16.7 | 6.8 | 67.0 | 4.6 | 5.1 | 19.3 | 4.54 | |
| | | 3 | 16.7 | 6.8 | 67.0 | 2.8 | 3.1 | 16.3 | 4.46 | 171.80 |
| 24 | | 1 | 16.7 | 6.8 | 67.0 | 6.2 | 7.2 | 19.8 | 4.84 | |
| | | 2 | 16.7 | 6.8 | 67.0 | 4.0 | 5.6 | 19.5 | 4.86 | |
| | | 3 | 16.7 | 6.8 | 67.0 | 2.5 | 3.8 | 14.9 | 4.67 | 171.75 |
| 25 | | 1 | 16.7 | 6.8 | 67.0 | 5.6 | 8.1 | 16.3 | | |
| | | 2 | 16.7 | 6.8 | 67.0 | 3.8 | 6.4 | 16.9 | 4.86 | |
| | | 3 | 16.7 | 6.8 | 67.0 | 3.0 | 5.2 | 15.0 | 4.78 | 171.12 |
| 26 | | 1 | 17.4 | 4.0 | 67.0 | 3.7 | 7.1 | 20.1 | | |
| | | 2 | 17.4 | 4.0 | 67.0 | 3.0 | 6.6 | 20.6 | | |
| 27 | | 1 | 17.4 | 4.0 | 67.0 | 5.4 | 7.7 | 34.3 | | |
| | | 2 | 17.4 | 4.0 | 67.0 | 4.3 | 6.8 | 25.9 | | |
| 28 | | 1 | 17.4 | 4.0 | 67.0 | 4.6 | 8.9 | 32.5 | | |
| | | 2 | 17.4 | 4.0 | 67.0 | 2.9 | 7.0 | 23.0 | | |
| 29 | | 1 | 16.7 | 6.8 | 40.2 | 4.4 | 10.7 | 12.3 | | |
| | | 2 | 16.7 | 6.8 | 40.2 | 5.9 | 10.5 | 7.7 | | |

Results (1) For compounds without bulky substituent(s), multiple AE addition leads to significant improvement in polymer isotacticity as shown in Ref. numbers 1, 3, 4, 9, 12, 13, and 15-25.

(2) Introduction of a small alkyl group, such as methyl, to the ethylene moiety of the AE linker increased catalyst activity as shown in Ref. numbers 4, 9, and 13.

(3) Presence of bulky group(s) in the AE molecule results in high XS as shown in Ref. numbers 2, 5-8, 11, 14, and 26-29.

(4) Bulky group on the ethylene moiety of the AE lowers catalyst activity in addition to increasing XS as shown in Ref numbers 5, 7, 8, 14, and 29.

(5) Higher AE content in catalyst corresponds to lower XS as shown in Ref numbers 1, 3, 4, 9, 12, 13, and 15-24.

(6) Lower XS and high $T_{MF}$ are achieved by multiple AE additions during procatalyst formation as shown in Ref numbers 1, 3, 4, 9, 12, 13, and 15-25.

(7) Multiple donor addition of AE with a bulky ending alkoxy group does not result in XS improvement as shown in Ref number 2.

Polymerization: Polymerization is performed in liquid propylene in a 1-gallon autoclave. After conditioning, the reactor is charged with 1375 g of propylene and 67 mmol of hydrogen and brought to 62° C. 0.25 mmol of dicyclopentyldimethoxysilane is added to 7.2 ml of a 0.27 M triethylaluminum solution in isooctane, followed by addition 0.18 ml of a 5.0 wt % procatalyst slurry in mineral oil. The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is maintained at 67° C. Total polymerization time is 1 hour.

TABLE 3

| Run # | Donor Addition Delay (min.) | Ti (%) | OEt (%) | AAE (%) | EB (%) | Activity (kg PP/g catalyst/h) | MFR (10 g/min) | XS (%) | D50 (μm) | D90 (μm) | Span |
|---|---|---|---|---|---|---|---|---|---|---|---|
| A | 0 | 2.18 | 0.24 | 12.1 | 1.10 | 16.5 | 3.1 | 4.3 | 78.7 | 170.4 | 1.7 |
|   |   |      |      |      |      |      |     |     | 64.3 | 121.0 | 1.3 |
| B | 1 | 2.29 | 0.21 | 11.5 | 0.92 | 18.7 | 3.4 | 4.7 | 60.4 | 99.3  | 1.0 |
|   |   |      |      |      |      |      |     |     | 55.1 | 76.0  | 0.7 |
| C | 3 | 2.38 | 0.26 | 9.2  | 1.35 | 18.7 | 2.8 | 4.5 | 47.6 | 63.6  | 0.5 |
|   |   |      |      |      |      |      |     |     | 47.3 | 60.6  | 0.5 |
| D | 5 | 2.17 | 0.34 | 8.9  | 0.95 | 22.6 | 3.0 | 5.0 | 46.7 | 59.5  | 0.5 |
|   |   |      |      |      |      |      |     |     | 46.5 | 58.8  | 0.4 |

3. Delayed Addition of Alkoxyalkyl Ester

Figure 1B:
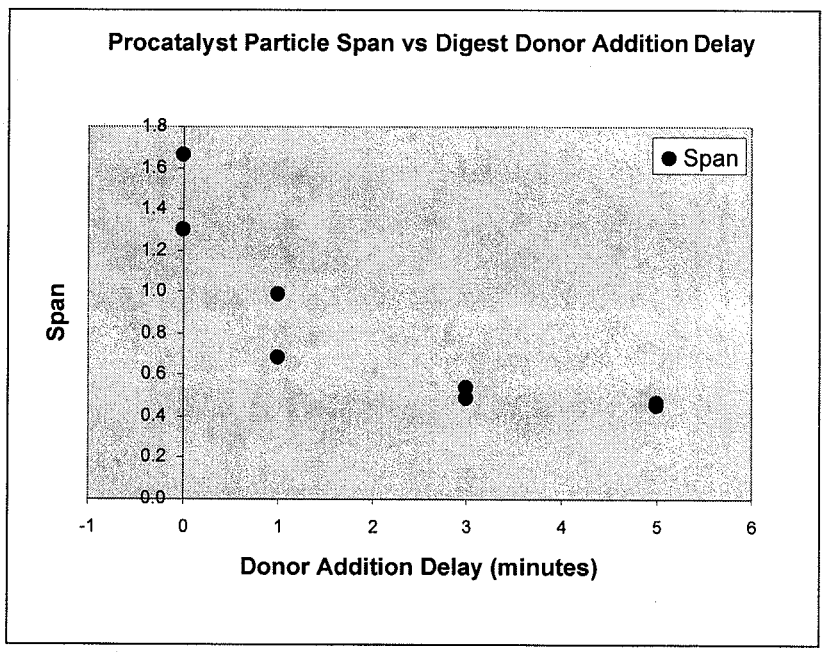
FIG. 1B is a graph showing catalyst particle size distribution (PSD) span versus the delay in alkoxyalkyl ester addition in accordance with an embodiment of the present disclosure.

A series of catalysts are made in which the first addition of alkoxyalkyl ester is delayed from 0 to 5 minutes after heating the reaction mixture. Table 3 and FIGS. 1A and 1B show that the agglomeration which occurs with the high AE loading diminishes as the AE addition delay is increased.

The procatalyst preparation comprises three TiCl$_4$ halogenations. The first contact step includes addition of 3.63 mmol of 2-methoxy-1-methylethyl benzoate (AAE) to a suspension of 3.00 g of 50 μm MagTi-1 in 60 ml of a mixed solvent (50% TiCl$_4$/chlorobenzene (vol/vol)). The mixture is heated from ambient temperature to 115° C. in 15 minutes and then held at this temperature for 60 minutes. For the initial designed set of experiments, the AE is added to the mixture immediately after equilibrating the solvent below the frit and before initiating the temperature ramp. In all remaining experiments, the AE is added after initiating the temperature ramp.

The second contact step again utilizes 2.42 mmol of AAE and 60 ml of mixed solvent. The reaction mixture is heated to 115° C. in 15 minutes and maintained at this temperature with stirring for 30 minutes. The third step, halogenation, utilizes 60 ml of mixed solvent, but no AE. Again, the reaction is heated to 115° C. in 15 minutes and then maintained at this temperature for 30 minutes. The final procatalyst is rinsed three times in room temperature isooctane and dried under nitrogen flow for 2 hours.

Mixed solvent is added to the MagTi-1 precursor (0.5 min) and the solvent is equilibrated below the frit (3 min). The addition time delay clock is started when the heat ramp is initiated. With 0 minutes on the time delay clock, the span is high (1.3-1.7) and D50 and D90 average 71 μm and 145 μm, respectively, with notable variation in the contributing data points. With a 3-minute delay, the particle size distribution span lined out near 0.5 and D50 and D90 reached 47.5 μm and 62.1 μm, respectively. Delayed addition of the internal electron donor improves morphology significantly. The best balance in the catalyst set occurred with the 3-minute delay, where agglomeration is eliminated and XS increases only slightly.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A process comprising:
   first contacting a procatalyst precursor with an alkoxyalkyl ester and a halogenating agent to form a procatalyst intermediate, the first contacting comprising
   reacting the halogenating agent with the procatalyst precursor, and
   adding the alkoxyalkyl ester from greater than 0 minutes to about 30 minutes after the reacting, thereby forming the procatalyst intermediate;
   second contacting the procatalyst intermediate with an alkoxyalkyl ester that is the same or different than the alkoxyalkyl ester in the first contacting, and a halogenating agent; and
   forming a procatalyst composition comprising a combination of a magnesium moiety, a titanium moiety, and the alkoxyalkyl ester, wherein the alkoxyalkyl ester is present in the amount of greater than 4.5 wt %.

2. The process of claim 1 wherein the first contacting occurs in a reaction mixture having a temperature from 30° C. to 150° C.

3. The process of claim 1 comprising third contacting the procatalyst intermediate with an alkoxyalkyl ester and a halogenating agent; and
   forming a procatalyst composition comprising greater than 5.0 wt % alkoxyalkyl ester.

4. The process of claim 1 wherein the first contacting comprises contacting the procatalyst precursor with an alkoxyalkyl ester having the structure (I)

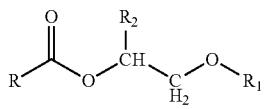

wherein R, $R_1$ and $R_2$ are the same or different, each of R and $R_1$ is selected from the group consisting of a $C_1$-$C_{20}$ primary alkyl group, a substituted $C_1$-$C_{20}$ primary alkyl group, and a $C_2$-$C_{20}$ alkene group; and $R_2$ is selected from the group consisting of hydrogen, a $C_1$-$C_{20}$ primary alkyl group, a substituted $C_1$-$C_{20}$ primary alkyl group, and a $C_2$-$C_{20}$ alkene group.

5. The process of claim 1 comprising forming a procatalyst composition comprising particles having a particle size distribution (PSD) span of less than 2.0.

6. The process of claim 1 comprising adding the alkoxyalkyl ester from greater than 0 minutes to about 5 minutes after the reacting.

7. The process of claim 1 comprising forming a procatalyst composition comprising from 0.01 wt % to 0.7 wt % ethoxide.

8. The process of claim 1 comprising forming particles of the procatalyst composition having a D50 from 10 microns to 50 microns.

9. The process of claim 1 wherein the first contacting comprises contacting a mixed magnesium/titaniuim compound with the alkoxyalkyl ester and the halogenating agent.

10. The process of claim 1 comprising forming particles of the procatalyst composition and eliminating agglomeration of the particles.

11. The process of claim 1 wherein the second contacting comprises contacting the procatalyst intermediate with an alkyoxyalkyl ester that is the same as the alkoxyalkyl ester in the first contacting.

12. A process comprising:
first halogenating a procatalyst precursor to form a reaction mixture;
heating the reaction mixture to a temperature from 30° C. to 150° C.;
first adding first and second alkoxyalkyl esters to the reaction mixture from greater than 0 minutes to 30 minutes after the heating to form a procatalyst intermediate;
second halogenating the procatalyst intermediate;
second adding an alkoxyalkyl ester to the procatalyst intermediate; and
forming particles of a procatalyst composition, the particles having a particle size distribution span of less than 2.0, and wherein the procatalyst composition comprises a combination of a magnesium moiety, a titanium moiety, and the alkoxyalkyl ester, wherein the alkoxyalkyl ester is present in the amount of greater than 5.0 wt %.

13. The process of claim 12 comprising second heating the procatalysts intermediate to a temperature from 30° C. to 150° C. before the second adding.

14. the process of claim 12 comprising first adding the alkoxyalkyl esters to the reaction mixture from greater than 0 minutes to about 5 minutes after the heating to form a procatalyst intermediate.

15. A process comprising:
first contacting a procatalyst precursor with an aromatic alkoxyalkyl ester and a halogenating agent to form a procatalyst intermediate, the aromatic alkoxyalkyl ester having the structure (III)

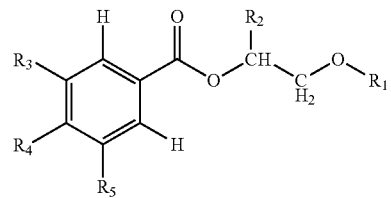

wherein $R_1$ and $R_2$ are the same or different, $R_1$ is selected from the group consisting of a $C_1$-$C_{20}$ primary alkyl group, a substituted $C_1$-$C_{20}$ primary alkyl group, and a $C_2$-$C_{20}$ alkene group;

$R_2$ is selected from the group consisting of hydrogen, a $C_1$-$C_{20}$ primary alkyl group, a substituted $C_1$-$C_{20}$ primary alkyl group, and a $C_2$-$C_{20}$ alkene group;

$R_3$, $R_4$, $R_5$ are the same or different, each of $R_3$, $R_4$, $R_5$ is selected from the group consisting of a heteroatom, a $C_1$-$C_{20}$ hydrocarbyl group, a substituted $C_1$-$C_{20}$ hydrocarbyl group, and a $C_1$-$C_{20}$ hydrocarbyloxy group;

second contacting the procatalyst intermediate with an alkoxyalkyl ester that is the same or different than the alkoxyalkyl ester in the first contacting, and a halogenating agent; and forming a procatalyst composition comprising a combination of a magnesium moiety, a titanium moiety and greater than 10 wt % of the aromatic alkoxyalkyl ester.

16. The process of claim 15 wherein the first contacting comprises adding a first aromatic alkoxyalkyl ester of structure (III) and a second alkoxyalkyl ester to the reaction mixture.

17. The process of claim 15 wherein the second contacting comprises adding a first aromatic alkoxyalkyl ester of structure (III) and a second alkoxyalkyl ester to the procatalyst intermediate.

18. The process of claim 15, further comprising a third contacting of the procatalyst intermediate with an alkoxyalkyl ester and a halogenating agent.

19. A process comprising:
first halogenating a procatalyst precursor to form a reaction mixture;
heating the reaction mixture to a temperature from 30° C. to 150° C.;
first adding an aromatic alkoxyalkyl ester to the reaction mixture from greater than 0 minutes to 30 minutes after the heating to form a procatalyst intermediate, the aromatic alkoyxyalkyl ester having the structure (III)

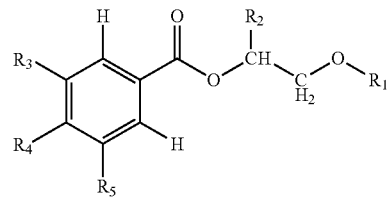

wherein $R_1$ and $R_2$ are the same or different, $R_1$ is selected from the group consisting of a $C_1$-$C_{20}$ primary alkyl group, a substituted $C_1$-$C_{20}$ primary alkyl group, and a $C_2$-$C_{20}$ alkene group;

$R_2$ is selected from the group consisting of hydrogen, a $C_1$-$C_{20}$ primary alkyl group, a substituted $C_1$-$C_{20}$ primary alkyl group, and a $C_2$-$C_{20}$ alkene group;

$R_3$, $R_4$, $R_5$ are the same or different, each of $R_3$, $R_4$, $R_5$ is selected from the group consisting of a heteroatom, a $C_1$-$C_{20}$ hydrocarbyl group, a substituted $C_1$-$C_{20}$ hydrocarbyl group, and a $C_1$-$C_{20}$ hydrocarbyloxy group;

second halogenating the procatalyst intermediate;

second adding an alkoxyalkyl ester to the procatalyst intermediate; and forming particles of a procatalyst composition, the particles having a particle size distribution span of less than 2.0.

20. The process of claim 19 comprising forming a procatalyst composition comprising a combination of a magnesium moiety, a titanium moiety and greater than 10 wt % of the aromatic alkoxyalkyl ester.

21. A process comprising:

first contacting in a reaction mixture a procatalyst precursor with a first and a second alkoxyalkyl ester and a halogenating agent to form a procatalyst intermediate, the first contacting comprising reacting the halogenating agent with the procatalyst precursor, and adding the first and second alkoxyalkyl esters from greater than 0 minutes to about 30 minutes after the reacting;

second contacting the procatalyst intermediate with an alkoxyalkyl ester that is the same or different than the first and second alkoxyalkyl esters in the first contacting, and a halogenating agent; and forming a procatalyst composition comprising a combination of a magnesium moiety, a titanium moiety and greater than 4.5 wt % of the first and second alkoxyalkyl esters.

22. A process comprising:

first contacting a procatalyst precursor with an alkoxyalkyl ester and a halogenating agent to form a procatalyst intermediate, the first contacting comprising reacting the halogenating agent with the procatalyst precursor, and adding the alkoxyalkyl ester from greater than 0 minutes to about 30 minutes after the reacting;

second contacting the procatalyst intermediate with an alkoxyalkyl ester that is the same or different than the alkoxyalkyl ester in the first contacting, and a halogenating agent, wherein the second contacting comprises adding a first alkoxyalkyl ester and a second alkoxyalkyl ester to the procatalyst intermediate; and forming a procatalyst composition comprising a combination of a magnesium moiety, a titanium moiety and the alkoxyalkyl ester.

23. A process comprising:

first contacting a procatalyst precursor with an alkoxyalkyl ester which is 2-methoxy-1-methylethyl benzoate and a halogenating agent to form a procatalyst intermediate, the first contacting comprising reacting the halogenating agent with the procatalyst precursor, and adding the alkoxyalkyl ester from greater than 0 minutes to about 30 minutes after the reacting;

second contacting the procatalyst intermediate with an alkoxyalkyl ester that is the same or different than the alkoxyalkyl ester in the first contacting, and a halogenating agent; and forming a procatalyst composition comprising a combination of a magnesium moiety, a titanium moiety and the alkoxyalkyl ester.

24. A process comprising:

first contacting a procatalyst precursor with an alkoxyalkyl ester which is 2-methoxyethyl benzoate and a halogenating agent to form a procatalyst intermediate, the first contacting comprising reacting the halogenating agent with the procatalyst precursor, and adding the alkoxyalkyl ester from greater than 0 minutes to about 30 minutes after the reacting;

second contacting the procatalyst intermediate with an alkoxyalkyl ester that is the same or different than the alkoxyalkyl ester in the first contacting, and a halogenating agent; and forming a procatalyst composition comprising a combination of a magnesium moiety, a titanium moiety and the alkoxyalkyl ester.

25. The process of claim 1, wherein the first contacting step further comprises contacting the procatalyst precursor with a first and second alkoxyalkyl ester.

* * * * *